United States Patent
Lanneer et al.

(10) Patent No.: US 12,413,905 B2
(45) Date of Patent: Sep. 9, 2025

(54) APPARATUS, METHODS AND COMPUTER PROGRAMS FOR REDUCING ECHO

(71) Applicant: NOKIA TECHNOLOGIES OY, Espoo (FI)

(72) Inventors: Wouter Lanneer, Antwerp (BE); Werner Coomans, Zellik (BE); Paschalis Tsiaflakis, Heist-op-den-Berg (BE)

(73) Assignee: NOKIA TECHNOLOGIES OY, Espoo (FI)

( * ) Notice: Subject to any disclaimer, the term of this patent is extended or adjusted under 35 U.S.C. 154(b) by 206 days.

(21) Appl. No.: 18/069,718

(22) Filed: Dec. 21, 2022

(65) Prior Publication Data
US 2023/0199386 A1 Jun. 22, 2023

(30) Foreign Application Priority Data
Dec. 21, 2021 (GB) .................................... 2118594

(51) Int. Cl.
*H04R 3/02* (2006.01)
*G10L 21/0208* (2013.01)

(52) U.S. Cl.
CPC ............ *H04R 3/02* (2013.01); *G10L 21/0208* (2013.01); *G10L 2021/02082* (2013.01)

(58) Field of Classification Search
CPC .................. H04R 3/02; G10L 21/0208; G10L 2021/02082
See application file for complete search history.

(56) References Cited

U.S. PATENT DOCUMENTS 5,307,405 A * 4/1994 Sih ........................ H04B 3/23
379/345
6,775,653 B1 * 8/2004 Wei ........................ H04B 3/23
379/406.01

(Continued)

FOREIGN PATENT DOCUMENTS

EP 1 715 669 A1 10/2006
WO WO 2014/099281 A1 6/2014

OTHER PUBLICATIONS

Duttweiler, D., "Subsampling to Estimate Delay with Application to Echo Cancelling", IEEE Transactions on Acoustics, Speech, and Signal Processing, vol. ASSP-31, No. 5, (Oct. 1983), 10 pages.

(Continued)

*Primary Examiner* — Daniel R Sellers
(74) *Attorney, Agent, or Firm* — ALSTON & BIRD LLP

(57) ABSTRACT

Apparatus, methods and computer programs are provided for reducing echo in microphone signals. The apparatus can be configured to obtain an echo path delay estimate and obtain information indicative of a number of future frames used by an acoustic echo cancellation filter. The apparatus can also be configured to obtain information indicative of a time shift between consecutive frames processed by the acoustic echo cancellation filter. The apparatus can also be configured to determine at least a first delay to be added to a loudspeaker signal and determine at least a second delay to be added to a microphone signal. The determination of the first delay and the second delay is based on the echo path delay estimate, the number of future frames and the time shift between consecutive frames processed by the acoustic echo cancellation filter.

19 Claims, 11 Drawing Sheets

(56) References Cited

U.S. PATENT DOCUMENTS

Figure 1:
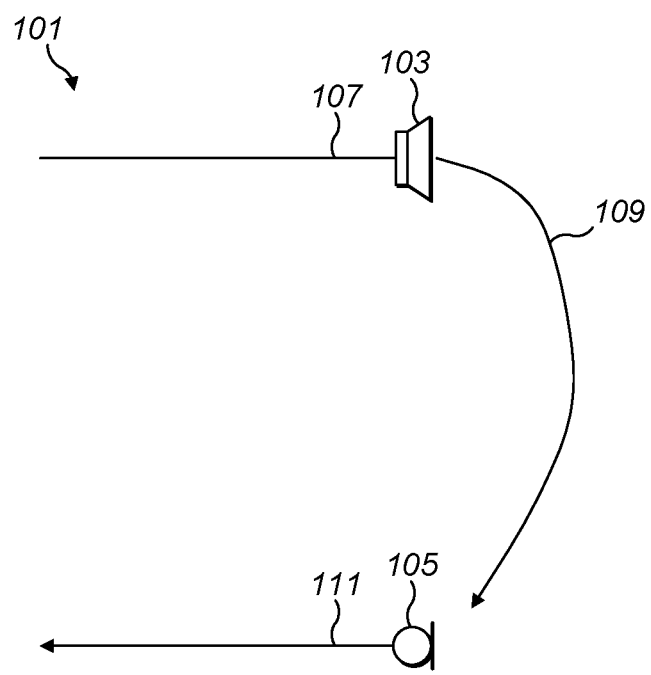

| | | | |
|---|---|---|---|
| 7,319,748 B2 | 1/2008 | Stenger | |
| 8,503,669 B2 | 8/2013 | Mao | |
| 9,307,318 B2 | 4/2016 | Anderton et al. | |
| 11,127,414 B2 | 9/2021 | Husain et al. | |
| 2006/0251261 A1* | 11/2006 | Christoph | H04R 3/04 381/1 |
| 2008/0192946 A1* | 8/2008 | Faller | H04M 9/082 381/66 |
| 2009/0323924 A1 | 12/2009 | Tashev et al. | |
| 2010/0290615 A1* | 11/2010 | Takahashi | H04M 9/082 379/406.08 |
| 2014/0148224 A1* | 5/2014 | Truong | H04M 9/085 455/557 |
| 2015/0332704 A1* | 11/2015 | Sun | H04L 49/9023 704/227 |
| 2017/0310360 A1 | 10/2017 | Gejo et al. | |
| 2020/0411030 A1 | 12/2020 | Fazeli et al. | |

OTHER PUBLICATIONS

Extended European Search Report for European Application No. 22209531.7 dated May 15, 2023, 7 pages.

Lu et al., "Enhancing Echo Cancellation via Estimation of Delay", IEEE Transactions on Signal Processing, vol. 53, No. 11, (Nov. 2005), 10 pages.

Search Report for United Kingdom Application No. GB2118594.7 dated May 3, 2022, 3 pages.

Sheikhzadeh et al., "Low-Resource Delayless Subband Adaptive Filter Using Weighted Overlap-Add", Proceedings of the 13th European Signal Processing Conference (EUSIPCO 2005), (Sep. 2005), 4 pages.

Völcker et al., "Robust and Low Complexity Delay Estimation", International Workshop on Acoustic Signal Enhancement 2012, (Sep. 4-6, 2012), 4 pages.

* cited by examiner

APPARATUS, METHODS AND COMPUTER PROGRAMS FOR REDUCING ECHO

CROSS-REFERENCE TO RELATED APPLICATIONS

This application claims priority to Great Britain Application No. 2118594.7, filed Dec. 21, 2021, the entire contents of which are incorporated herein by reference.

TECHNOLOGICAL FIELD

Examples of the disclosure relate to apparatus, methods and computer programs for reducing echo. Some relate to apparatus, methods and computer programs for reducing echo in microphone signals.

BACKGROUND

Audio capture systems can enable immersive voice applications such as teleconferencing or mediated reality environments. Such systems use simultaneous audio capture and playback to enable real time spatial audio to be transmitted over communications networks. Acoustic echo cancellation is used in such systems to remove acoustic echoes of the loudspeakers from the microphone signals. This avoids the loudspeaker echo degrading the quality of the spatial audio captured by the microphones.

BRIEF SUMMARY

According to various, but not necessarily all, examples of the disclosure there is provided an apparatus comprising means for:
  obtaining an echo path delay estimate;
  obtaining information indicative of a number of future frames used by an acoustic echo cancellation filter wherein the acoustic echo cancellation filter comprises a time-frequency filterbank configured to generate an acoustic echo cancelled signal for a current time frame;
  obtaining information indicative of a time shift between consecutive frames processed by the acoustic echo cancellation filter;
  determining at least a first delay to be added to a loudspeaker signal; and
  determining at least a second delay to be added to a microphone signal;
  wherein the determination of the first delay and the second delay is based on the echo path delay estimate, the number of future frames and the time shift between consecutive frames processed by the acoustic echo cancellation filter and wherein the first delay and the second delay are determined so that an effective echo path delay is obtained that is dependent upon the time shift.

The first delay and the second delay may be used to provide a reduced echo microphone signal.

Reducing echo may comprise one or more of:
  increasing echo return loss enhancement;
  increasing short time objective intelligibility score; and
  increasing perceptual evaluation of speech quality score The first delay and the second delay may reduce processing latency of the microphone signal.

The reduction in processing latency may comprise reducing the processing latency between a microphone and an output of an acoustic echo cancellation processing block.

The time-frequency filterbank upon which the acoustic echo cancellation filter is based may comprise at least one of:
  short term Fourier transform filterbank;
  weighted overlap-add filterbank; in combination with one or more sub-band adaptive acoustic echo cancellation filters.

The effective echo path delay may comprise an echo path delay estimate adjusted by the first delay and the second delay.

The time shift between consecutive frames processed by the acoustic echo cancellation filter may comprise a hop size and the effective echo path delay comprises an integer number of hop sizes.

The means may be for enabling the first delay to be provided to a first delay unit where the first delay unit is configured to add a delay to at least one loudspeaker signal.

The means may be for enabling the first delay to be provided to a plurality of first delay units where the plurality of first delay units are configured to add a delay to a plurality of loudspeaker signals.

The means may be for enabling the second delay to be provided to a second delay unit where the second delay unit is configured to add a delay to at least one microphone signal.

The means may be for enabling the second delay to be provided to a plurality of second delay units where the plurality of second delay units are configured to add a delay to a plurality of microphone signals.

The means may be for enabling a plurality of third delays to be added to a plurality of reduced echo signals to enable encoding for spatial audio.

The means may be for enabling the same second delay to be provided to a plurality of second delay units where the plurality of second delay units are configured to add a delay to a plurality of microphone signals.

The means may be for enabling the first delay to be added in the time domain and the second delay to be added in the time domain.

The means may be for enabling the second delay to be added, at least partially, in the time domain and, at least partially, in the frequency domain.

According to various, but not necessarily all, examples of the disclosure there is provided an apparatus comprising at least one processor; and at least one memory including computer program code, the at least one memory and the computer program code configured to, with the at least one processor, cause the apparatus at least to perform:
  obtaining an echo path delay estimate;
  obtaining information indicative of a number of future frames used by an acoustic echo cancellation filter wherein the acoustic echo cancellation filter comprises a time-frequency filterbank configured to generate an acoustic echo cancelled signal for a current time frame;
  obtaining information indicative of a time shift between consecutive frames processed by the acoustic echo cancellation filter;
  determining at least a first delay to be added to a loudspeaker signal; and
  determining at least a second delay to be added to a microphone signal;
  wherein the determination of the first delay and the second delay is based on the echo path delay estimate, the number of future frames and the time shift between consecutive frames processed by the acoustic echo cancellation filter and wherein the first delay and the second delay are determined so that an effective echo path delay is obtained that is dependent upon the time shift.

According to various, but not necessarily all, examples of the disclosure there is provided an electronic device comprising an apparatus as claimed in any preceding claim wherein the electronic device is at least one of: a telephone, a camera, a computing device, a teleconferencing device.

According to various, but not necessarily all, examples of the disclosure there is provided a method comprising:
obtaining an echo path delay estimate;
obtaining information indicative of a number of future frames used by an acoustic echo cancellation filter wherein the acoustic echo cancellation filter comprises a time-frequency filterbank configured to generate an acoustic echo cancelled signal for a current time frame;
obtaining information indicative of a time shift between consecutive frames processed by the acoustic echo cancellation filter;
determining at least a first delay to be added to a loudspeaker signal; and
determining at least a second delay to be added to a microphone signal;
wherein the determination of the first delay and the second delay is based on the echo path delay estimate, the number of future frames and the time shift between consecutive frames processed by the acoustic echo cancellation filter and wherein the first delay and the second delay are determined so that an effective echo path delay is obtained that is dependent upon the time shift.

According to various, but not necessarily all, examples of the disclosure there is provided a computer program comprising computer program instructions that, when executed by processing circuitry, cause:
obtaining an echo path delay estimate;
obtaining information indicative of a number of future frames used by an acoustic echo cancellation filter wherein the acoustic echo cancellation filter comprises a time-frequency filterbank configured to generate an acoustic echo cancelled signal for a current time frame;
obtaining information indicative of a time shift between consecutive frames processed by the acoustic echo cancellation filter;
determining at least a first delay to be added to a loudspeaker signal; and
determining at least a second delay to be added to a microphone signal;
wherein the determination of the first delay and the second delay is based on the echo path delay estimate, the number of future frames and the time shift between consecutive frames processed by the acoustic echo cancellation filter and wherein the first delay and the second delay are determined so that an effective echo path delay is obtained that is dependent upon the time shift.

BRIEF DESCRIPTION

Figure 2:
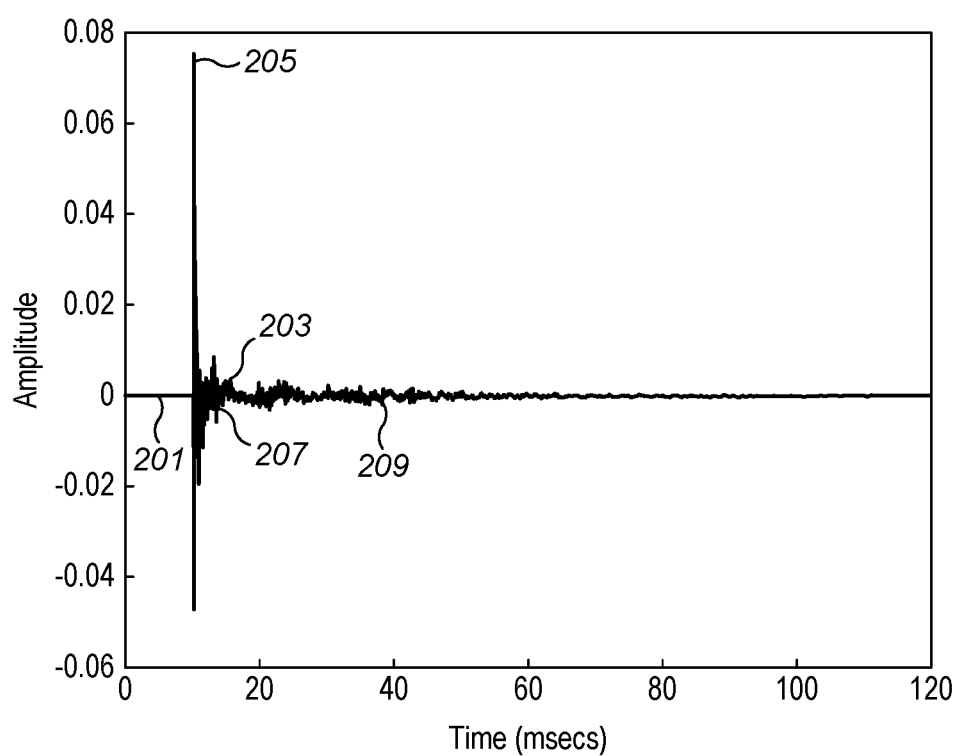
Figure 3:
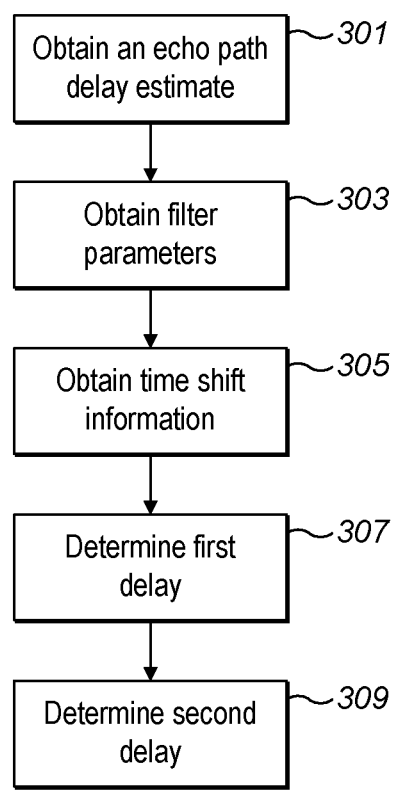
Figure 4:
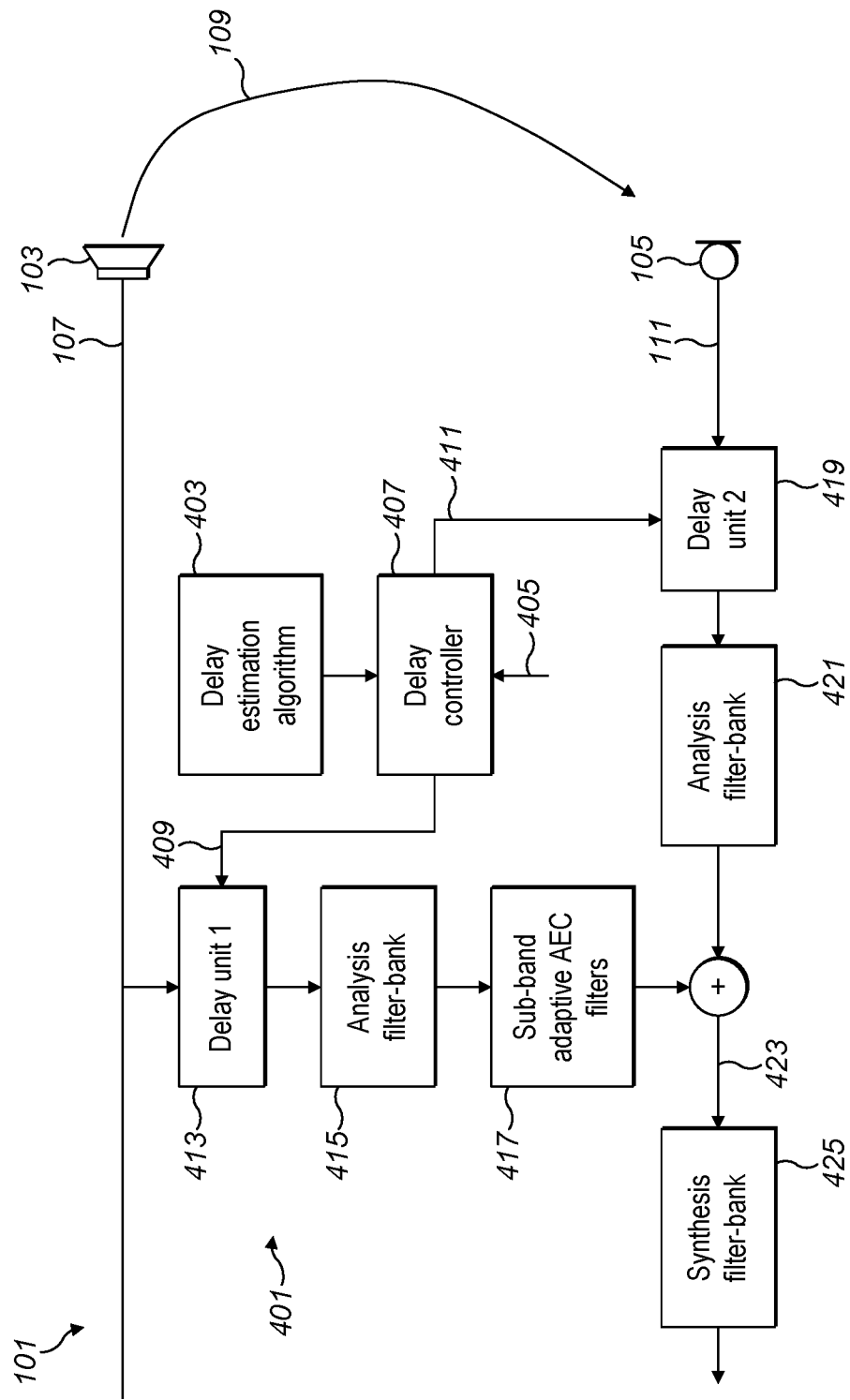
Figure 5:
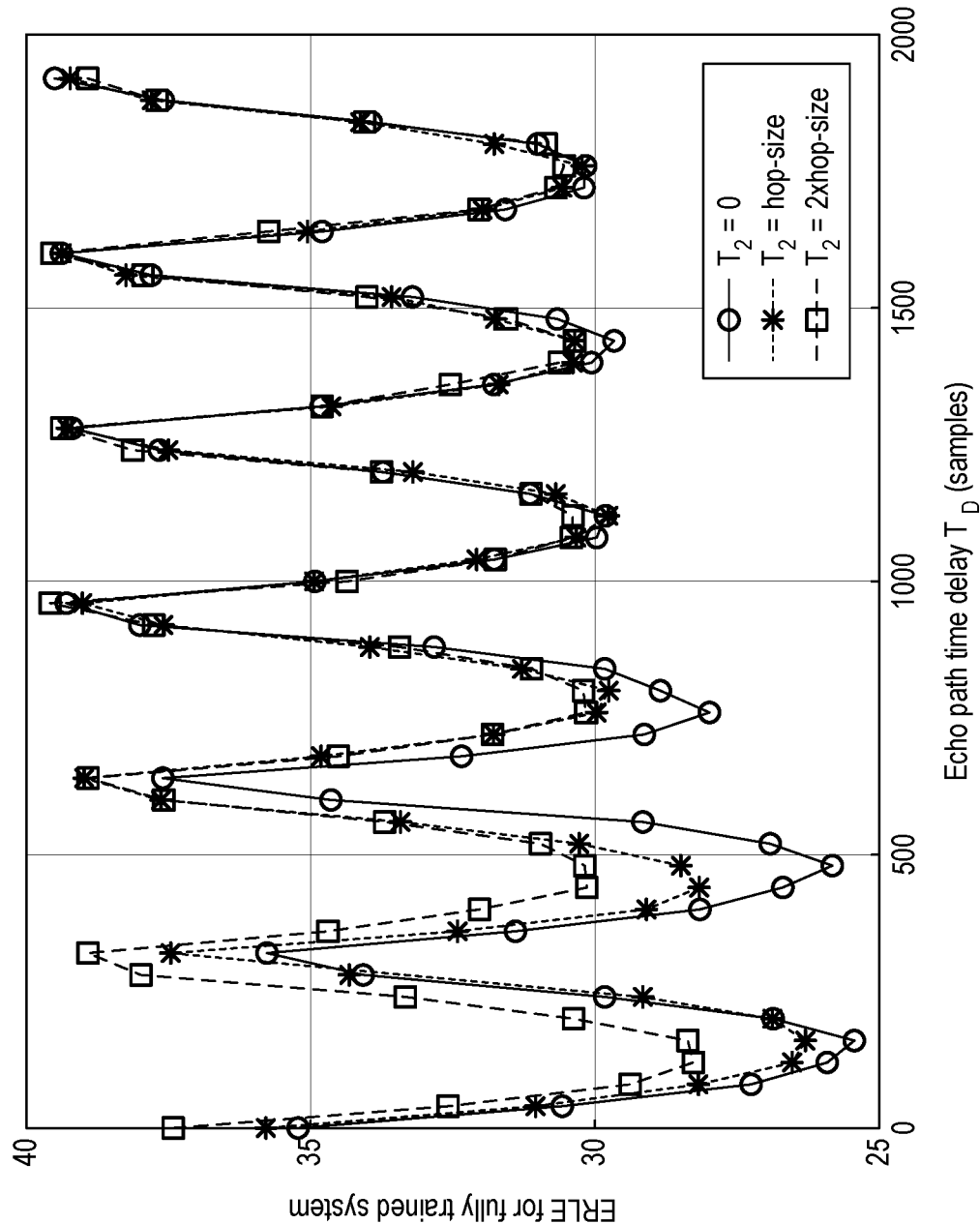
Figure 6:
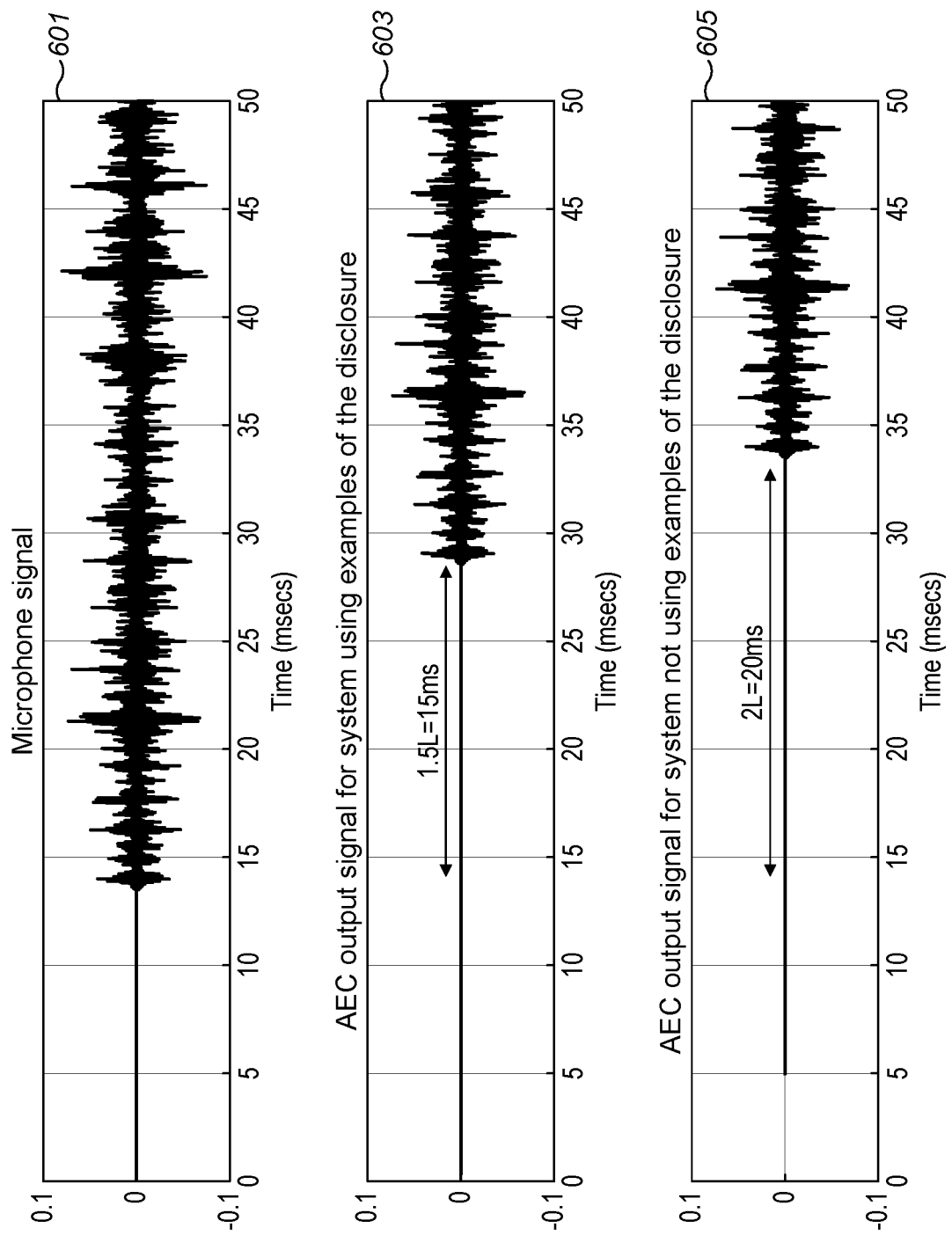
Figure 7B:
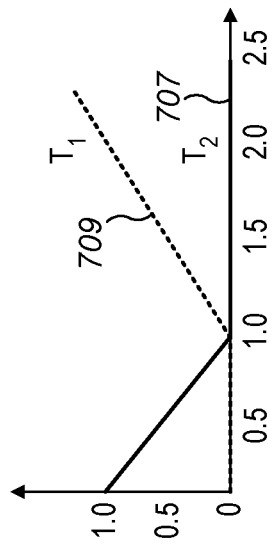
Figure 7D:
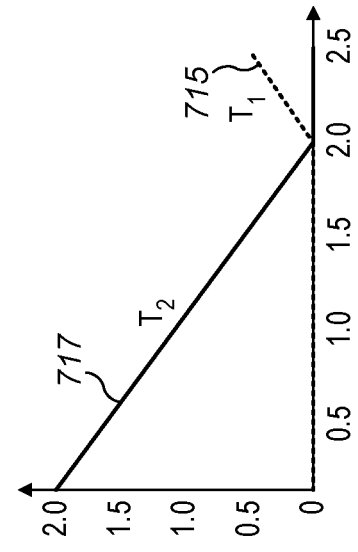
Figure 8:
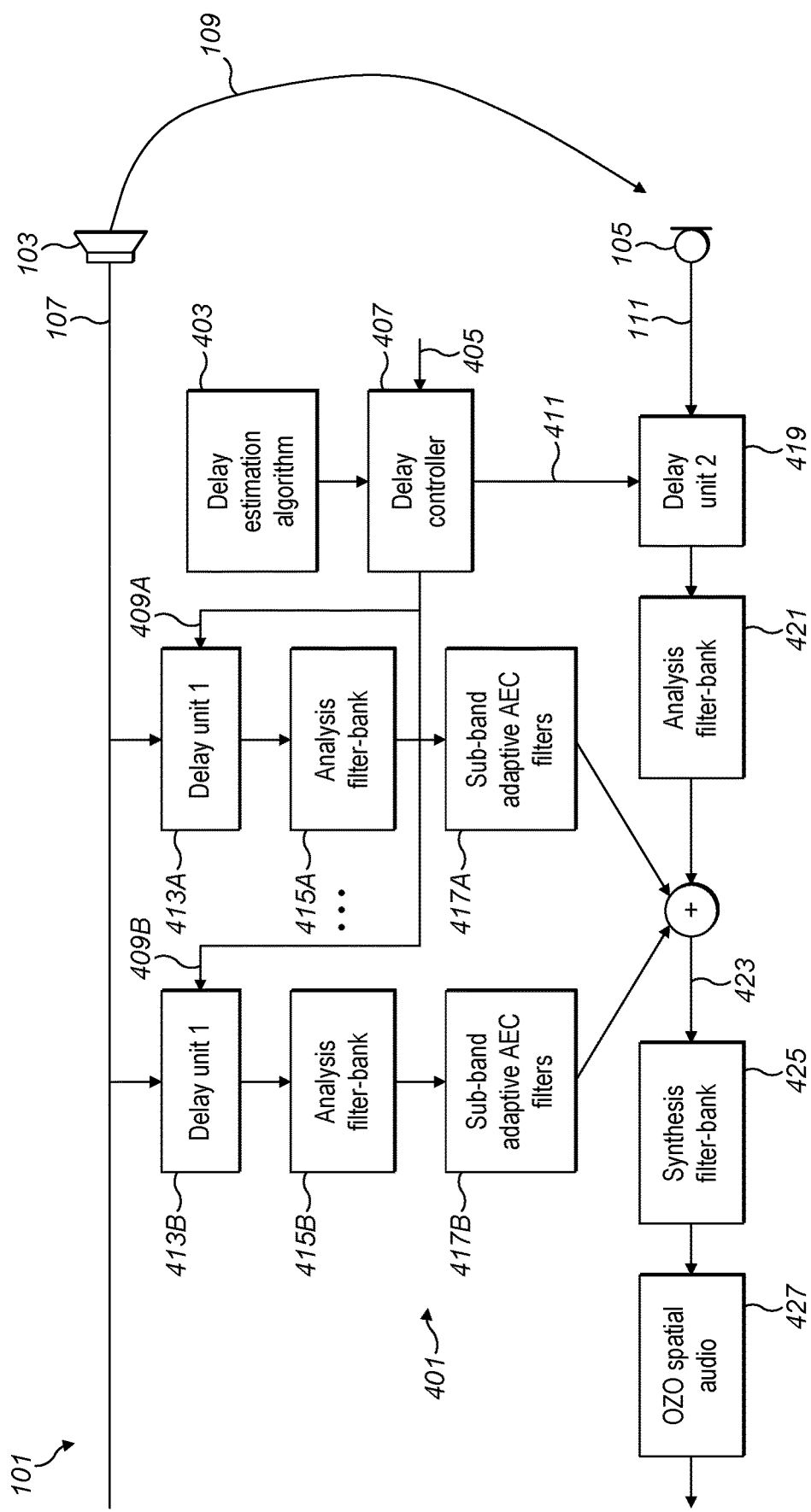
Figure 9:
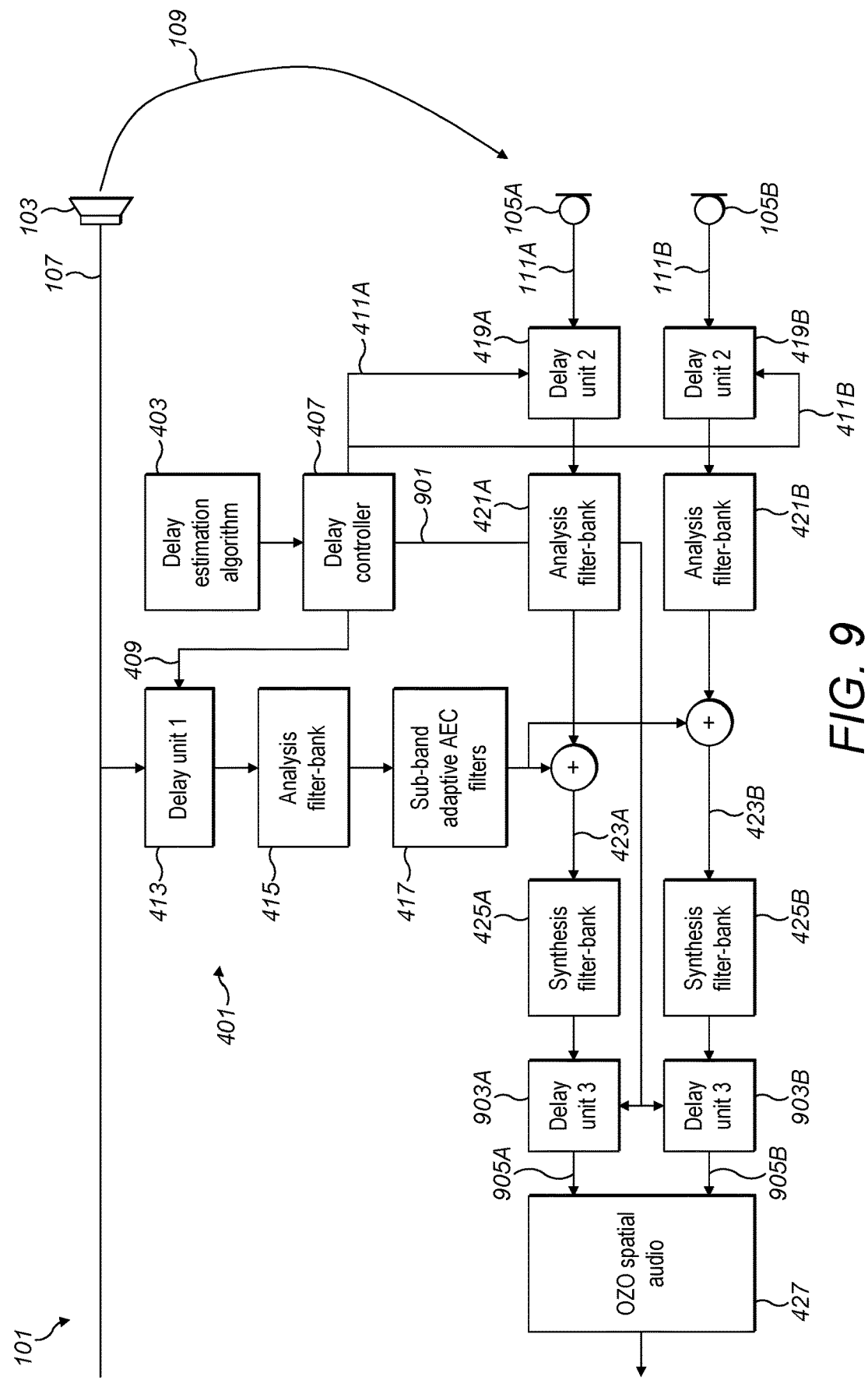
Figure 10:
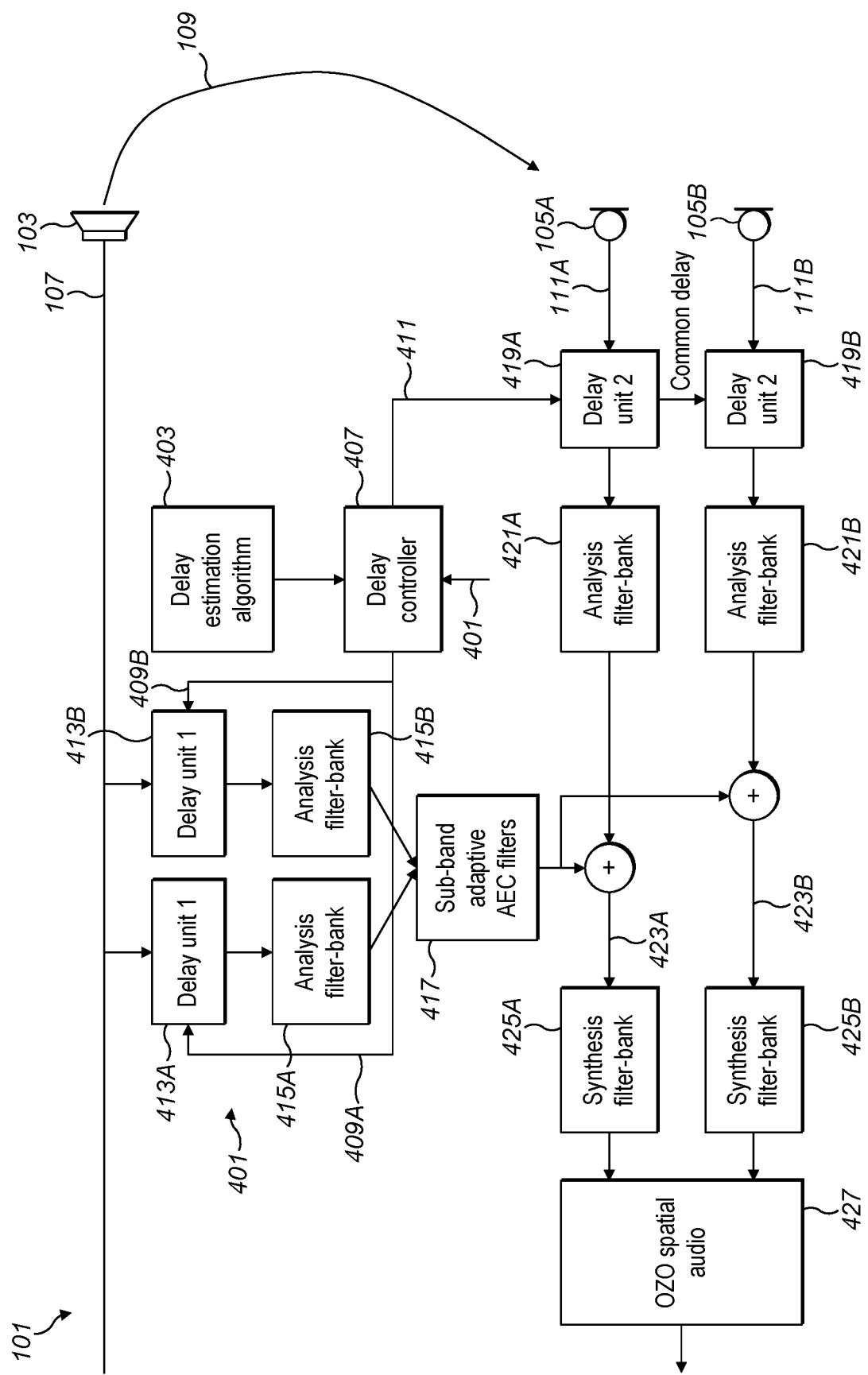
Figure 11:
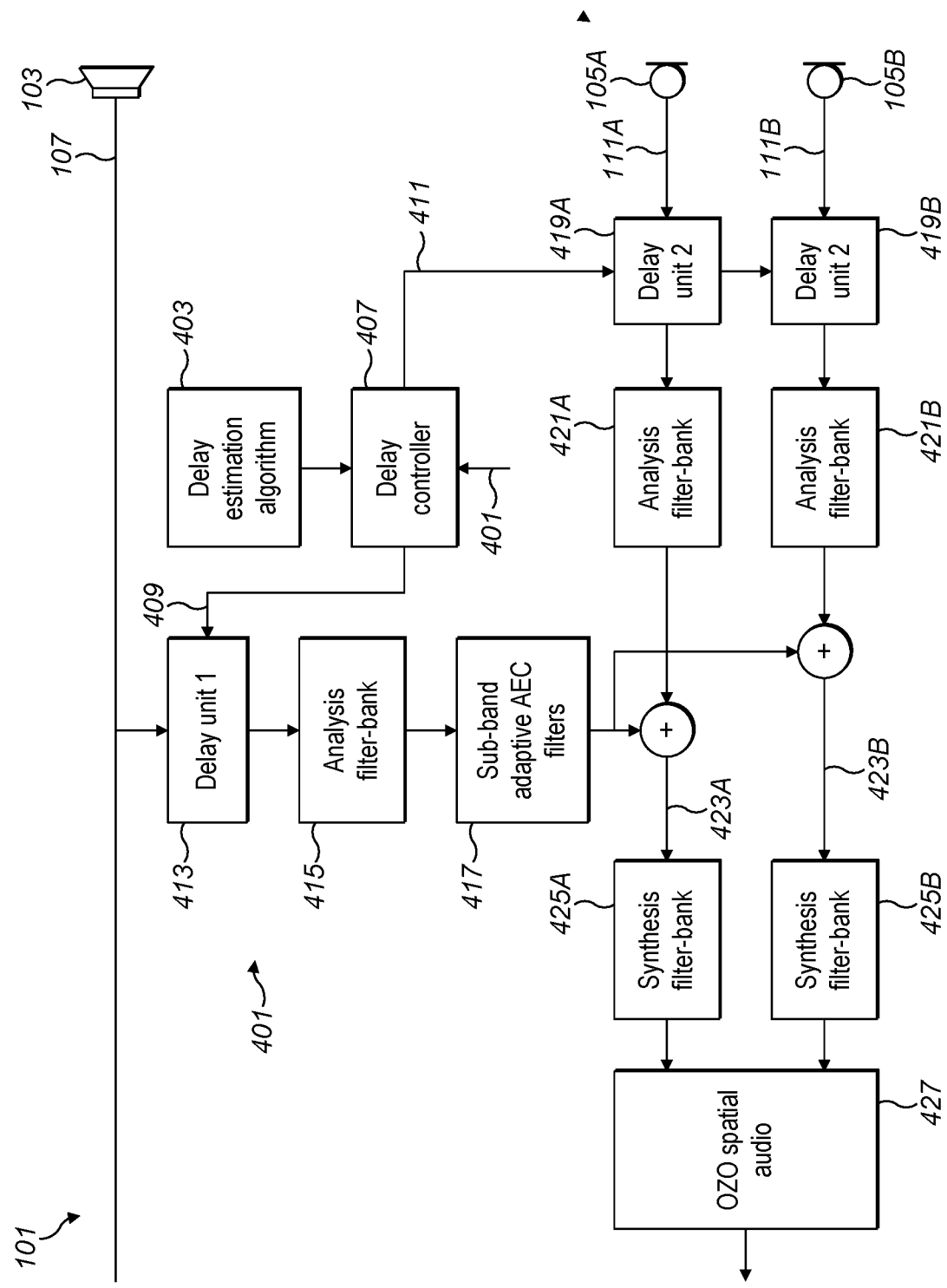
Figure 12:
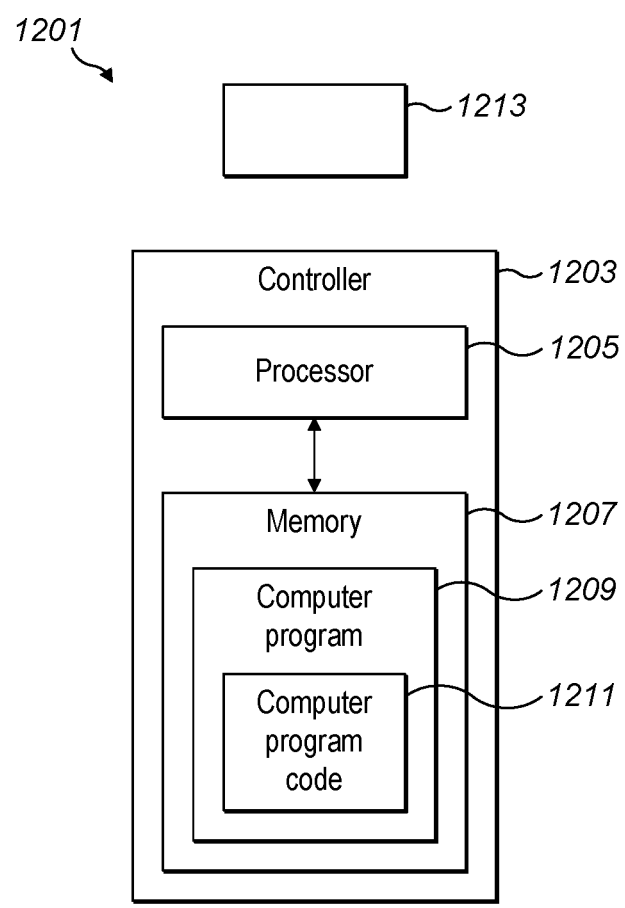

Some examples will now be described with reference to the accompanying drawings in which:
FIG. 1 shows an example system;
FIG. 2 shows an echo path impulse response;
FIG. 3 shows an example method;
FIG. 4 shows an example system;
FIG. 5 shows a plot relating ERLE to channel delay;
FIG. 6 shows a plot of microphone signals and delayed microphone signals;
FIGS. 7A to 7D show plots of results obtained using examples of the disclosure;
FIG. 8 shows an example system;
FIG. 9 shows an example system;
FIG. 10 shows an example system;
FIG. 11 shows an example system; and
FIG. 12 shows an example apparatus.

DETAILED DESCRIPTION

FIG. 1 shows an example system; 101 in which examples of the disclosure could be implemented. The system 101 comprises at least one loudspeaker 103 and at least one microphone 105. The system 101 could be provided within an electronic device such as a mobile phone, a camera, a teleconferencing device, a computing device or any other suitable type of device.

The system 101 is configured so that a loudspeaker signal 107 is provided to the loudspeaker 103. This controls the loudspeaker 103 to generate audio. The microphones 105 can comprise any means that can be configured to detect sounds and convert the sounds to an electrical output microphone signal 111.

In this system 101 an echo path 109 exists between the loudspeaker 103 and the microphones 105. This means that audio from the loudspeaker 103 can be detected by the microphones 105. This can create an unwanted echo within the microphones signals 111 provided by the microphones.

The example system 101 shown in FIG. 1 comprises a single loudspeaker 103 and a single microphone 103. In other examples the system 101 could comprise a plurality of loudspeakers 103 and/or a plurality of microphones 105.

Examples of the disclosure can be used in such systems to reduce the unwanted echo.

FIG. 2 shows an example echo path impulse response. The echo path impulse response could be for a system 101 such as the system shown in FIG. 1. This is the response captured at the microphone when the loudspeaker is fed with an impulse signal (with a non-zero value at time zero and a zero value elsewhere).

The echo path impulse response comprises a dead time 201 and an active region 203. As shown in FIG. 2 there is no echo response in the dead time 201. The dead time 201 can be indicative of the time delay of the true physical echo path. During the dead time 201 the channel output from the microphone 105 will be silent.

Different components and aspects of the system 101 can contribute to the dead time 201. In the example system of FIG. 1 the dead time 201 can comprise a system delay component and a propagation time component. The propagation time component is dependent on the echo path 109 between the loudspeaker 103 and the microphone 105. The system component is dependent upon delays such as data buffering by the audio device, latency within components such as analogue to digital converters (ADCs) and digital to analogue converters (DACs) or other relevant delays within the system 101.

The channel output from the microphone 105 is not silent during the active region 203. The active region 203 comprises an impulse response 205 a plurality of secondary peaks 207 and reverberation tail 209. The impulse response 205 corresponds to a line-of-sight peak for the echo path. This can also be referred to as the direct sound. The plurality of secondary peaks 207 correspond to the early reflections. The early reflections are typically related to the geometry of the acoustic environment. The reverberation tail 209 corresponds to late reflections that have a more diffuse nature.

Different shapes of echo path impulse responses could be generated in different systems 101 and examples.

In examples of the disclosure an acoustic echo cancellation filter can be applied to the loudspeaker signal 107 and the filtered loudspeaker signal can then be combined with the microphone signals to help to reduce the echo within the microphone signals 111. The acoustic echo cancellation filter can be designed to fit the echo path impulse response as well as possible.

The acoustic echo cancellation filter can be designed to comprise a delay corresponding to the dead time 201. There is no need to filter this part of a signal because the echo path impulse response is zero-valued in the dead time 201 region. The acoustic echo cancellation filter can be shifted using a delay so that it only covers the active region 203. The use of the delay can reduce the overall length of the acoustic echo cancellation filter that is needed. It can also increase the amount of the reverberation tail 209 that is covered by the acoustic echo cancellation filter and so can improve the reduction of the echo. Reducing the overall length of the acoustic echo cancellation filter can provide for a faster start-up time and can reduce computational complexity.

Examples of the disclosure provide for a method of reducing the echo within audio systems such as the system 101 of FIG. 1 by controlling the delays that are added to the microphone signals 111 and the loudspeaker signals 109. In some examples these delays could be optimised, or substantially optimised, so as to reduce echo within microphone signals 111.

FIG. 3 shows an example method that can be implemented in examples of the disclosure. The method could be implemented in a system 101 such as the system shown in FIG. 1. The method could be used to determine the delay that is to be added to the loudspeaker signal 107 and the microphone signal 111 so as to reduce the effects of echo in the system 101. FIG. 3 shows an order to the blocks. Implementations of the disclosure could apply the blocks of the method in any suitable order.

At block 301 the method comprises obtaining an estimate for an echo path delay. The echo path delay comprises components due to the propagation of the audio along the echo path 109 between the loudspeaker 103 and the microphone 105 and also components due to processing delays within the system 101.

At block 303 the method comprises obtaining filter parameters. The filter parameters can be parameters relating to an acoustic echo cancellation filter that can be used to filter a loudspeaker signal 107 before it is combined with a microphone signal 111.

The filter parameters that are obtained can comprise information indicative of a number of future frames used by the acoustic echo cancellation filter to generate an acoustic echo cancelled signal for a current time frame.

The acoustic echo cancellation filter can comprise any suitable type of filter. The acoustic echo cancellation filter can comprise a time-frequency filterbank. The time-frequency filterbank upon which the acoustic echo cancellation filter is based can comprise any suitable type of filterbank. For example, it could comprise a short-term
Fourier transform filterbank, a weighted overlap-add filterbank or any other suitable type of filterbank. The filterbank can be provided in combination with one or more sub-band adaptive acoustic echo cancellation filters.

At block 305 the method comprises obtaining information indicative of a time shift between consecutive frames processed by the acoustic echo cancellation filter. The information can be indicative of a time shift between any consecutive time frames. The time shift between consecutive frames processed by the acoustic echo cancellation filter comprises a hop size or any other suitable parameter. The hop size can be the number of samples between consecutive frames of the filterbank. The consecutive frames can be partially overlapping in time.

At block 307 the method comprises determining at least a first delay to be added to the loudspeaker signal 107 and at block 309 the method comprises determining at least a second delay to be added to the microphone signal 11.

The determination of the first delay and the second delay is based on the echo path delay estimate, the number of future frames and the time shift between consecutive frames processed by the acoustic echo cancellation filter. Examples of how the first delay and the second delay can be calculated are described herein.

The first delay and the second delay can be determined so that the effective echo path delay is dependent upon the time shift between consecutive frames processed by the acoustic echo cancellation filter. The effective echo path delay comprises the echo path delay estimate adjusted by the first delay and the second delay. In some examples first delay and the second delay can be determined so that the effective echo path delay can comprise an integer number of hop sizes of the filterbanks of the acoustic echo cancellation filter.

In examples of the disclosure the first delay and the second delay adjust the effective echo path delay so as provide a reduced echo microphone signal. The reduced echo microphone signal comprises less echo than the microphone signal. The echo could be cancelled, or substantially cancelled, in the reduced echo microphone signal. Reducing echo can comprise controlling any suitable parameters. In some examples reducing echo can comprise, increasing echo return loss enhancement, increasing short time objective intelligibility score, increasing perceptual evaluation of speech quality score and/or controlling any other parameter. The echo return loss enhancement can comprise the ratio of the microphone power and the residual echo. In some examples controlling the parameter can comprise maximising or substantially maximising the appropriate parameter.

In some examples the sizes of the first delay and the second delay can be selected so as to reduce processing latency of the microphone signal 111. The reduction in the processing latency comprises reducing the processing latency between a microphone 103 and an output of an acoustic echo cancellation processing block provided within a system 101.

Once the method of FIG. 3 has been performed the first delay can be added to a loudspeaker signal 107 and the second delay can be added to a microphone signal 111. To enable the first delay to be added to a loudspeaker signal 107 information indicative of the first delay can be provided to one or more first delay units. This can enable the first delay unit to add the appropriate delay to the loudspeaker signal 107. Similarly, to enable the second delay to be added to a microphone signal 111 information indicative of the second delay can be provided to one or more second delay units. This can enable the second delay unit to add the appropriate delay to the microphone signal 111.

In examples where the system 101 comprises a plurality of loudspeakers 103 a plurality of first delay units can be comprised within the system 101. In some examples the different first delay units can be configured to add different first delays as appropriate to the different loudspeaker signals 107. Similarly in some examples the system 101 could comprise a plurality of microphones 103. In such examples the system 101 can comprise a plurality of second delay units configured to second delays as appropriate to the different microphone signals 111. In some examples different second delays could be added to different microphone signals 111. In some examples the same second delays could be added to the different microphone signals 111.

The delays can be added to the microphone signals 111 and the loudspeaker signals 107 in any suitable domain. For example, both the first delay and the second delay can be added in the time domain. In some examples the second delay can be added, at least partially in the time domain and, at least partially, in the frequency domain.

In the example of FIG. 3 a first delay and a second delay are determined. In other examples additional delays could be determined. For instance, in some examples a third delay could be added after the acoustic echo cancellation block in order to synchronise signals for spatial audio encoding or for any other suitable purpose.

FIG. 4 schematically shows an example system 101 that can be used to implement methods of the disclosure such as the method shown in FIG. 3. The system 101 comprises a loudspeaker 103 and a microphone 105. A loudspeaker signal 107 is provided to the loudspeaker 103 and a microphone signal 111 is provided by the microphone 105. An echo path 109 exists between the loudspeaker 103 and the microphones 105.

In the example of FIG. 4 the system 101 also comprises an acoustic echo cancellation block 401. The acoustic echo cancellation block 401 comprises means for enabling delays to be added to microphone signal 111 and the loudspeaker signal 107 to reduce the echo in the microphone signal 111. The output of the acoustic echo cancellation block 401 can comprise an echo-reduced microphone signal 111.

In this example the acoustic echo cancellation block 401 comprises a delay estimation block 403, delay controller 407, a first delay unit, 413, a first analysis filter bank 415, sub-band adaptive filters 417, a second delay unit 419 and a second analysis filterbank 421. The acoustic echo cancellation block 401 could comprise different components and/or have different configurations in other examples of the disclosure.

The delay controller block 407 is configured to implement an algorithm that defines how parameters such as the echo path delay estimate, the number of future frames of an acoustic echo cancellation filter and the time shift between consecutive frames processed by the acoustic echo cancellation filter are used to determine the delays that are to be added to the microphone signal 111 and the loudspeaker signal 107. The delay controller block 407 receives a delay estimation from the delay estimation block 403 as an input.

The delay controller block 407 also receives an input 405 indicative of the number of future frames of an acoustic echo cancellation filter. The delay controller block can also receive an input indicative of the time-shift between consecutive frames of the acoustic echo cancellation filter. The acoustic echo cancellation filter can be used to filter the loudspeaker signal 107. The future frames can be referred to as lookahead frames.

The delay controller 407 can comprise any means that can be configured to use the delay inputs from the delay estimation algorithm block 403 and the input 405 indicative of the number of future frames of an acoustic echo cancellation filter, and an input indicative of the time-shift between consecutive frames of the acoustic echo cancellation filter, to determine a first delay for the loudspeaker signal 107 and a second delay for the microphone signal 111. The delay controller 407 can use the method of FIG. 3, or any other suitable method, to determine the first delay and the second delay. The delay controller 407 can comprise an apparatus 1201 as shown in FIG. 12 and/or any other suitable means.

The delay controller 407 provides a first output 409 comprising information indicative of the first delay and a second output 411 comprising information indicative of the second delay.

The first output 409 is provided to the first delay unit 413. The first delay unit 413 can comprise any means that can be configured to add a delay into a signal. The first delay unit 413 is configured to enable a delay to be added to a loudspeaker signal 107. The loudspeaker signal 107 comprises a reference of the echo that is to be reduced or cancelled.

The first delay unit 413 is configured to enable the delay to be added to the loudspeaker signal 107 before the loudspeaker signal 107 is filtered. The first output 409 controls the size of the delay that is added to the loudspeaker signal 107.

The first delay unit 413 provides a delayed loudspeaker signal as an output. The delayed loudspeaker signal is provided to an acoustic echo cancellation filter. The acoustic echo cancellation filter can comprise any means that can be configured to remove the echo impulse response from the loudspeaker signal 107. In this example the acoustic echo cancellation filter comprises an analysis filterbank 415 in combination with one or more sub-band adaptive acoustic echo cancellation filters 417.

The analysis filterbank 415 can comprise a short-term Fourier transform filterbank, a weighted overlap-add filterbank or any other suitable type of filterbank. The filterbanks are configured to split the acoustic echo cancellation filter into a plurality of short-parallel frequency domain sub-bands. The sub-band adaptive acoustic echo cancellation filters 417 can then be used to filter the sub-bands at a reduced sampling rate.

The second output 411 of the delay controller 407 is provided to the second delay unit 419. The second delay unit 419 can comprise any means that can be configured to add a delay into a microphone signal 111. The microphone signal 111 comprises an altered version of the loudspeaker signals that is to be reduced or cancelled and a desired signal that is to be retained.

The second delay unit 419 is configured to enable a delay to be added to a microphone signal 111. In the example of FIG. 4 the second delay unit 419 is configured to enable the delay to be added to the microphone signal 111 before the microphone signal 111 is filtered. In other examples the second delay unit 419 can be configured to enable the delay to be added to the microphone signal 111 after the microphone signal 111 is filtered by the filterbank 421 but before the acoustic echo cancellation block 401. The second output 411 controls the size of the delay that is added to the microphone signal 111.

The second delay unit 419 provides a delayed microphone signal 111 as an output. The delayed microphone signal is provided to a second analysis filterbank 421. The second analysis filterbank 421 can comprise the same type of filterbank as the first filterbank 415. For example, the second analysis filterbank 421 could comprise a short-term Fourier transform filterbank, a weighted overlap-add filterbank or any other suitable type of filterbank.

The acoustic echo cancellation block 401 is configured to enable the filtered microphone signal to be combined with the filtered loudspeaker signal. This can enable the echo to be reduced or cancelled within the microphone signal. The acoustic echo cancellation block 401 therefore provides an output 423 comprising a reduced echo microphone signal.

The reduced echo microphone signal can be provided to a synthesis filter bank 425 to enable rendering of audio based on the microphone signals. The synthesis filter bank 425 can enable spatial audio rendering or any other suitable type of rendering.

The combination of the echo path delay and the first delay added to the loudspeaker signal and the second delay added to the microphone signal result in an effective echo path delay. The effective echo path delay $\overline{T_D}$ can be defined as:

$$\overline{T_D} = T_D - T_1 + T_2$$

Where $T_D$ is the dead time 201 of the echo path impulse response $T_1$ is the value of the first delay that is added to the loudspeaker signal 107

$T_2$ is the value of second delay that is added to the microphone signal 111.

This equation shows the case for a single loudspeaker 103 and a single microphone 105. In other examples a plurality of loudspeakers 103 and/or microphones 105 can be provided within the system 101. In such cases an effective echo path delay $\overline{T_D}^{km}$ can be determined for the different pairings of loudspeakers k and microphones m.

The first delay therefore effectively reduces the echo path delay and the second delay effectively increases the echo path delay.

Systems 101 which have a large dead time 201 $T_D$ induce a delay in the microphone signal 111. This effectively generates lookahead or future frames for the acoustic echo cancellation filter. The effect of this is shown in FIG. 5 where having a larger dead time 201 $T_D$ enables a higher echo return loss enhancement to be obtained. Therefore, if a system 101 has a large dead time 201 $T_D$ this can be taken into account by the delay controller 407. For example, the delay controller 407 can reduce the processing latency of the filters.

In examples of the disclosure the values of the first delay and the second delay can be controlled so as to minimise:

$$\min_{T_1,T_2} |T_D - T_1 + T_2 - k*L|^2$$

Where k is the number of future frames used by the acoustic echo cancellation filter and L is a hop size of the filterbank. The hop size of the filterbank provides information indicative of the time shift between consecutive frames processed by the acoustic echo cancellation filter. This minimisation can optimise, or substantially optimise, the echo reduction in the system. This minimisation can also minimise, or substantially minimise, the latency caused by the delays and the processing of the signals within the system 101.

FIG. 5 shows a plot relating echo return loss enhancement (ERLE) to dead time 201 which can also be referred to as the echo path time delay $T_D$. The ERLE is a ratio of the microphone power and the residual echo within the microphone signal 111.

The data used for the plot in FIG. 5 was obtained from a simulation with a measured room impulse response (100 ms long). The AEC filter used was WOLA-NLMS (Weighted Overlap-Add Normalized Least mean Square) with 66% overlap (3× oversampling). The AEC filter was used with the first delay $T_1$ equal to 0 and the second delay $T_2$ equal to {0,hop-size, 2× hop-size}, which corresponds to a number of k={0, 1, 2} lookahead filter frames respectively, The hop size of the filterbank was 320 samples and a fixed NLMS step size was used. The sampling rate used was 48 kHz. White noise was used as the input signal and the ERLE was measured after convergence.

This plot shows that peaks of maximum ERLE are obtained if the echo path time delays combined with the second delay $T_2$ are close to k*hop-size where k is an integer. That is, a maximum ERLE can be obtained if the effective echo path delay $\overline{T_D}$ is an integer number of hop sizes or is close to an integer number of hop sizes.

The plot also shows that steep drops or minima of ERLE occur if the echo path time delays are close to (1/2+k)*hop-sizes. That is, a minimum ERLE occurs if the effective echo path delay $\overline{T_D}$ is an odd integer number of half-hop sizes or is close to an odd integer number of half-hop sizes.

It can be seen in FIG. 5 that the ERLE increases when having a larger second delay $T_2$. That is, having a larger number of future frames or lookahead frames for the acoustic echo cancellation filter can provide significant gains for ERLE however this comes at the cost of increased processing latency.

FIG. 6 shows plots of microphone signals and delayed microphone signals. The first plot 601 shows a microphone signal 111 that has not been delayed. This can be the case where there is no further processing of the microphone signals 111

The second plot 603 shows latency savings that can be obtained using examples of the disclosure. The second plot 603 shows an example output of an acoustic echo cancellation block that uses examples of this disclosure. The third plot 605 shows latency savings that can be obtained for systems that do not use examples of the disclosure. The third plot 605 shows an example output of an acoustic echo cancellation block that does not use examples of this disclosure. The acoustic echo cancellation block that does not use examples of the disclosure could use a SOTA delay scheme.

In this case the dead time 201 is equal to L/2 where L is a hop-size of the filterbank. A twice-oversampled WOLA-AEC (Weighted Overlap Add Acoustic Echo cancellation) filter (with 50% overlap) and one lookahead, or future, filter frame was used.

In this case the minimum possible latency of the filterbank is one hop-size which is equal to L samples. This is the inherent latency of the filterbank which is independent of any lookahead, or future, filter frames.

In the example which does not use examples of the disclosure the delay scheme involves removing the dead time 201 by delaying the loudspeaker signal provided to the acoustic echo cancellation filter. This adds a delay equal to the dead time 201 of L/2. A delay is then added to the microphone signal 111. This delay is equal to one hope size L. The delay added to the microphone signal 111 enables lookahead, or future, filter frames to be used. This delay can be added in the frequency domain. This creates a total processing latency of 2 L samples.

In the scenario that does use examples of the disclosure the first delay that is added to the loudspeaker signal 107 can be set to zero so that $T_1=0$. The second delay that is added to the microphone signal 111 can be set to L/2 so that $T_2=L/2$. The effective echo path delay $\overline{T_D}$ is therefore $\overline{T_D}=L$. This enables one lookahead or future frame to be used while only introducing half of the additional latency. In this example the total processing latency is 1.5 L samples.

The example of the disclosure therefore reduces the processing latency by 0.5 L samples. For a sampling rate of 48 kHz and L=480 samples, this saves 5 ms.

Reducing the latency provides an improved Quality of Experience (QoE) for the user. The latency that is relevant for the QoE is the latency experienced by the microphone signal 111 from the moment it is generated by the microphone 105 to the moment that it is rendered to an audio signal on the other end of the call. Any latency reduction in the acoustic echo cancellation processing will therefore provide an improved QoE.

FIGS. 7A to 7D show plots of results obtained using examples of the disclosure. These show improvements in latency that can be obtained using examples of the disclosure.

Figure 7A:
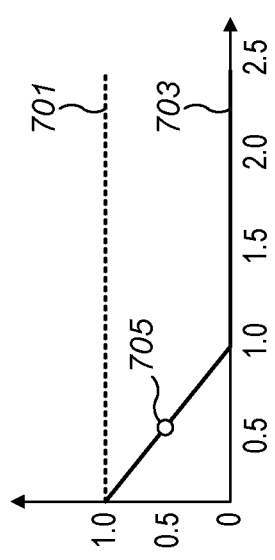

FIG. 7A plots the dead time 201 in units of hop size of the filterbank on the x axis and the additional latency introduced by the acoustic echo cancellation processing block on the y axis. The first plot 701 shows the latency for systems 101 which do not implement examples of the disclosure while the second plot 703 shows the latency for systems that for implement examples of the disclosure. The point 705 in the second plot shows the situation for the scenario given in FIG. 6.

FIG. 7B shows the values for the first delay $T_1$ that is to be added to the loudspeaker signal 107 in the first plot 707 and the second delay $T_2$ that is to be added to the microphone signal 111 in the second plot 709. The x axis plots the dead time 201 in units of hop size of the filterbank and they axis plots the additional latency introduced by the acoustic echo cancellation processing block.

In the example of FIGS. 7A and 7B one lookahead filter frame, or future filter frame, is used by the acoustic echo filter.

Figure 7C:
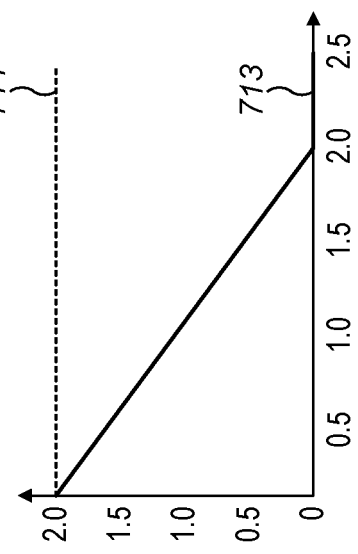

FIGS. 7C and 7D show similar plots to those in FIGS. 7A and 7B however in the examples of FIGS. 7C and 7D two lookahead filter frames, or future filter frames, are used by the acoustic echo filter.

In FIG. 7C the first plot 711 shows the latency for systems 101 which do not implement examples of the disclosure while the second plot 713 shows the latency for systems that for implement examples of the disclosure. Similarly in FIG. 7D the values for the first delay $T_1$ that is to be added to the loudspeaker signal 107 in the first plot 715 and the second delay $T_2$ that is to be added to the microphone signal 111 in the second plot 717.

These plots show that using the examples of disclosure and selecting appropriate delays can provide for reduced latency compared to systems that do not use examples of the disclosure.

FIG. 8 shows an example system 101 that comprises a plurality of loudspeakers 103 and a single microphone 103. The different loudspeakers 103 can have different dead times 201 between the respective loudspeakers 103 and the microphones 105.

This system 101 comprises an acoustic echo cancellation block 401 similar to the acoustic echo cancellation block 401 shown in FIG. 4. Corresponding reference numerals are used for corresponding components.

To enable the different dead times 201 to be taken into account the delay controller 407 can be configured to provide a plurality of first outputs 409A, 409B. The plurality of first outputs 409A, 409B comprise information indicative of a first delay that is to be added to a loudspeaker signal 107. Different outputs 409A, 409B can indicate different sized delays. This can enable delays of different sizes to be added to different loudspeaker signals 107.

The first outputs 409A, 409B are provided to first delay units 413A, 413B. In FIG. 8 only two first delay unit 413A, 413B are shown. The number of first units 413 could be the same as the number of loudspeakers 103. A different first delay unit 413 could be provided for each loudspeaker 103. Each of the first delay units 413 are configured to enable a different delay to be added to a loudspeaker signal 107.

The first delay unit 413 provides a delayed loudspeaker signal as an output. The delayed loudspeaker signal is provided to an acoustic echo cancellation filter. In this example a different acoustic echo cancellation filter is provided for each microphone signal 111. In this example each acoustic echo cancellation filter comprises an analysis filterbank 415A, 415B in combination with one or more sub-band adaptive acoustic echo cancellation filters 417A, 417B.

The second output 411 of the delay controller 407 is provided to the second delay unit 419 to enable a delay to be added to the microphone signal 111. The delayed microphone signal is provided to a second analysis filterbank 421. The acoustic echo cancellation block 401 is configured to enable the filtered microphone signal to be combined with the filtered loudspeaker signals.

The system in FIG. 8 is configured so that the reduced echo microphone signal can be provided to a synthesis filter bank 425 to enable rendering of audio based on the microphone signals. The synthesis filter bank 425 can enable spatial audio rendering or any other suitable type of rendering. The synthesized signal can then be used to provide spatial audio 427 such as OZO spatial audio or any other suitable type of audio.

The delay controller 407 can use any suitable process and/or algorithm to determine the delays that are to be added by the respective delay units 413, 419. In some examples the following algorithm could be used:

---

INPUT:
    L    Hop-size
    $[T_D]_l$    Echo path time delay between loudspeaker l and (reference) microphone
    B    Lookahead filter frames
OUTPUT:
    $[T_1]_l$    first delay that is to be added to a loudspeaker signal 409
    $T_2$    second delay that is to be added to the microphone signal 411
ALGORITHM:

$l_{min} \leftarrow \min_l [T_D]_{l1}$ %find shortest time delay between all loudspeakers and reference microphone If $[T_D]_{l_{min}1} > B * L$
    $[T_1]_l = [T_D]_l - B * L;$
    $T_2 = 0;$
Else
    $[T_1]_{l_{min}} = 0;$
    $[T_1]_l = [T_D]_l - [T_D]_{l_{min}}$ for $l \neq l_{min}$
    $T_2 = B * L - [T_D]_{l_{min}};$
end

---

FIG. 9 schematically shows another example system 101 that can be used to implement examples of the disclosure. In this example the system 101 can comprise a single loudspeaker 103 and a plurality of microphones 105. This system 101 could be used for spatial audio capture. The different microphones 105 can have different dead times 201 between the respective loudspeakers 103 and the microphones 105.

This system 101 also comprises an acoustic echo cancellation block 401 similar to the acoustic echo cancellation block 401 shown in FIGS. 4 and 8. Corresponding reference numerals are used for corresponding components.

To enable the different dead times 201 to be taken into account the delay controller 407 can be configured to provide a plurality of second outputs 411A, 411B. The plurality of second outputs 411A, 411B comprise information indicative of a second delay that is to be added to a microphone signal 111. Different outputs 411A, 411B can indicate different sized delays. This can enable delays of different sizes to be added to different microphone signals 111.

In the example of FIG. 9 a first output 409 is provided to a first delay unit 419. The first delay unit 413 provides a delayed loudspeaker signal as an output. The delayed loudspeaker signal is provided to an acoustic echo cancellation filter. In this example a different acoustic echo cancellation filter is provided for each microphone signal 111A, 111B.

The plurality of second outputs 411A, 411B are provided to different second delay units 419A, 419B. In FIG. 9 only two second delay units 419A, 419B are shown. The number of second delay units 419A, 419B could be the same as the number of microphones 105. A different second delay unit 419 could be provided for each microphone 105. Each of the second delay units 419A, 419B are configured to enable a different delay to be added to a microphone signal 111.

The second delay units 419A, 419B are configured to enable delays to be added to the different microphone signals 111A, 111B. The delayed microphone signals are provided to second analysis filterbanks 421A, 421B. In this example a different filterbank 421A, 421B is provided for each of the microphone signals 111. This can enable the delays to be optimised, or substantially optimised, for the different microphones 105.

The acoustic echo cancellation block 401 is configured to enable the filtered loudspeaker signals to be combined with each filtered microphone signal. This provides a plurality of separate reduced echo microphone signals 423A, 423B. In this example a different reduced echo microphone signal 423A, 423B is provided for each of the microphones 105A, 105B in the system 101.

The system 101 of FIG. 9 also comprises a synthesis filter bank 425A, 425B for each of the microphones 105A, 105B in the system 101. Each of the reduced echo microphone signals 423A, 423B are provided to a different synthesis filter bank 425A, 425B.

The system 101 of FIG. 9 is configured to add a third delay to be added to the reduced echo microphone signals 423A, 423B after they have been processed by the synthesis filterbanks 425A, 425B. In this system 101 the delay controller 407 is configured to provide a third output 901. The third output 901 comprises information indicative of a third delay.

The third output 901 is provided to the third delay units 903A, 903B. The third delay units 903A, 903B can comprise any means that can be configured to add a delay into a reduced echo microphone signal 423A, 423B after they have been processed by the synthesis filterbanks 425A, 425B.

In the example of FIG. 9 a plurality of third delay units 903A, 903B are provided. The plurality of third delay units 903A, 903B can be configured to enable different third delays to be added to different reduced echo microphone signals 423A, 423B.

The third delay can be configured to enable synchronization of the reduced echo microphone signals 423A, 423B. The synchronization realigns the timings of the reduced echo microphone signals 423A, 423B so as to enable encoding for spatial audio.

The third delay units 903A, 903B provide a synchronised reduced echo microphone signals 905A, 905B as an output.

These can then be used to provide spatial audio 427 such as OZO spatial audio or any other suitable type of audio.

The third delay that is added accounts for the different delays that are added to the different microphone signals 111A, 111B by the different second delay units 419A, 419B. This additional third delay will result in an increase in latency for the system 101 however this is likely to be small if the microphones 105 are fairly close to each other. However, this slight increase in latency will provide improved spatial audio quality due to the improved echo reduction and realignment of the signals.

In some examples the third delay $T_3$ can be determined by the smallest second delay $T_2$. For examples the third delay $T_3^n$ that is to be added for microphone signal 105 n can be determined by:

$$T_3^n = \max_m \{T_2^m\} - T_2^n$$

FIG. 10 schematically shows another example system 101 that can be used to implement examples of the disclosure. In this example the system 101 also comprises a single loudspeaker 103 and a plurality of microphones 105. This system 101 could also be used for spatial audio capture. The different microphones 105 can have different dead times 201 between the respective loudspeakers 103 and the microphones 105. The system in FIG. 10 is different to the system of FIG. 9 in that the same second delay is added to each of the microphone signals 111A, 111B. the different dead times 201 between the respective loudspeakers 103 and the microphones 105 can be accounted for by adding different first delays to the loudspeaker signal 107.

This system 101 shown in FIG. 10 comprises an acoustic echo cancellation block 401 similar to the acoustic echo cancellation block 401 shown in FIGS. 4, 8 and 9. Corresponding reference numerals are used for corresponding components.

To enable the different dead times 201 to be taken into account the delay controller 407 can be configured to provide a plurality of first outputs 409A, 409B. The plurality of first outputs 409A, 409B comprise information indicative of a first delay that is to be added to a loudspeaker signal 107. Different outputs 409A, 409B can indicate different sized delays. This can enable delays of different sizes to be added to the loudspeaker signals 107. These different delays compensate for the different dead times 201 between the loudspeakers 103 and the microphones 105.

The first delay units 413A, 413B provide delayed loudspeaker signals as an output. The delayed loudspeaker signals are provided to an acoustic echo cancellation filter. In this example the acoustic echo cancellation filter comprises an analysis filterbank 415A, 415B for each of the delayed loudspeaker signals and a single sub-band adaptive acoustic echo cancellation filter 417.

The second output 411 of the delay controller 407 is provided to different second delay units 419A, 419B. In FIG. 9 only two second delay units 419A, 419B are shown. The number of second delay units 419A, 419B could be the same as the number of microphones 105. A different second delay unit 419 could be provided for each microphone 105. In this example each of the second delay units 419A, 419B are configured to enable the same delay to be added to a microphone signal 111.

The delayed microphone signals are provided from the second delay units 419A, 419B to second analysis filterbanks 421A, 421B. In this example a different filterbank 421A, 421B is provided for each of the microphone signals 111.

The acoustic echo cancellation block 401 is configured to enable the filtered loudspeaker signals to be combined with each filtered microphone signal. This provides a plurality of separate reduced echo microphone signals 423A, 423B. In this example a different reduced echo microphone signal 423A, 423B is provided for each of the microphones 105A, 105B in the system 101.

The system 101 of FIG. 10 also comprises a synthesis filter bank 425A, 425B for each of the microphones 105A, 105B in the system 101. Each of the reduced echo microphone signals 423A, 423B are provided to a different synthesis filter bank 425A, 425B.

In this example there is no need to add an additional third delay because the difference in the dead times 201 has been accounted for by adding different first delays. The output signals from the different synthesis filter bank 425A, 425B can then be used to provide spatial audio 427 such as OZO spatial audio or any other suitable type of audio.

The example system of FIG. 10 enables the difference in the dead times 201 to be accounted for without adding any additional latency. However, this system 101 would require increased processing and memory usage due to the complexity of the system 101 and the increased number of filterbanks needed.

FIG. 11 schematically shows another example system 101 that can be used that also comprises a single loudspeaker 103 and a plurality of microphones 105. In this example the different dead times 201 between the respective loudspeakers 103 and the microphones 105 can be accounted for by assuming that the different microphones 105 are very close to each other.

This system 101 shown in FIG. 11 comprises an acoustic echo cancellation block 401 similar to the acoustic echo cancellation block 401 shown in FIGS. 4, 8, 9 and 10. Corresponding reference numerals are used for corresponding components.

The delay controller 407 provides a first output 409 comprising information indicative of the first delay and a second output 411 comprising information indicative of the second delay.

The first output 409 is provided to the first delay unit 413 to enable a delay to be added to a loudspeaker signal 107. The first delay unit 413 provides a delayed loudspeaker signal as an output. The delayed loudspeaker signal is provided to an acoustic echo cancellation filter. The acoustic echo cancellation filter comprises an analysis filterbank 415 in combination with one or more sub-band adaptive acoustic echo cancellation filters 417.

The second output 411 of the delay controller 407 is provided to a plurality of second delay units 419A, 419B. In FIG. 11 only two second delay units 419A, 419B are shown. The number of second delay units 419A, 419B could be the same as the number of microphones 105. A different second delay unit 419 could be provided for each microphone 105. In this example each of the second delay units 419A, 419B are configured to enable the same delay to be added to a microphone signal 111.

The delayed microphone signals are provided from the second delay units 419A, 419B to second analysis filterbanks 421A, 421B. In this example a different filterbank 421A, 421B is provided for each of the microphone signals 111.

The acoustic echo cancellation block 401 is configured to enable the filtered loudspeaker signals to be combined with each filtered microphone signal. This provides a plurality of separate reduced echo microphone signals 423A, 423B. In this example a different reduced echo microphone signal 423A, 423B is provided for each of the microphones 105A, 105B in the system 101.

The system 101 of FIG. 11 also comprises a synthesis filter bank 425A, 425B for each of the microphones 105A, 105B in the system 101. Each of the reduced echo microphone signals 423A, 423B are provided to a different synthesis filter bank 425A, 425B.

In this example there is no need to add an additional third delay because it has been assumed that the microphones 105 are close together so that the difference in the dead times 201 is small with respect to the hop size of the filterbanks. For example, if the system 101 could comprise two microphones that are 20 cm apart. In such cases, for a sound wave travelling parallel to the axis between the microphones, the maximum time difference between incident sound waves on the microphones 105 will be 0.6 ms This corresponds to 28 samples at 48 kHz. A typical hop size would be 320-960 samples (6.6 to 20 ms). In such examples there would be a reduction in the performance of the acoustic echo cancellation due to the effective echo path delay $T_D$ not being an exact integer number of hop sizes. However, this reduction would be negligible because the effective echo path delay $T_D$ is still very close to an integer number of hop sizes.

Therefore, the system 101 in FIG. 11 can operate in a similar manner as the system of FIG. 1 which comprises only a single microphone 105. In the system of FIG. 11 a single reference microphone 105 can be selected and used to determine the second delay that is to be added to all of the microphone signals 111.

The system of FIG. 11 is less complex than the examples of FIGS. 9 and 10 and uses fewer memory and processing resources.

Other systems 101 and arrangements could be used in other examples of the disclosure. For example, some systems 101 could comprise a plurality of loudspeakers 103 and a plurality of microphones 105. These systems 101 could use any suitable combination of the arrangements shown in FIGS. 8 to 11 and/or any other suitable arrangements.

FIG. 12 schematically illustrates an apparatus 1201 that can be used to implement examples of the disclosure. In this example the apparatus 1201 comprises a controller 1203. The controller 1203 can be a chip or a chip-set. In some examples the controller can be provided within a computer or other device that can be configured to provide signals and receive signals and/or datasets.

In the example of FIG. 12 the implementation of the controller 1203 can be as controller circuitry. In some examples the controller 1203 can be implemented in hardware alone, have certain aspects in software including firmware alone or can be a combination of hardware and software (including firmware).

As illustrated in FIG. 12 the controller 1203 can be implemented using instructions that enable hardware functionality, for example, by using executable instructions of a computer program 1209 in a general-purpose or special-purpose processor 1205 that can be stored on a computer readable storage medium (disk, memory etc.) to be executed by such a processor 1205.

The processor 1205 is configured to read from and write to the memory 1207. The processor 1205 can also comprise an output interface via which data and/or commands are output by the processor 1205 and an input interface via which data and/or commands are input to the processor 1205.

The memory 1207 is configured to store a computer program 1209 comprising computer program instructions (computer program code 1211) that controls the operation of the controller 1203 when loaded into the processor 1205. The computer program instructions, of the computer program 1209, provide the logic and routines that enables the controller 1203 to perform the methods illustrated in FIG. 3 The processor 1205 by reading the memory 1207 is able to load and execute the computer program 1209.

The apparatus 1201 therefore comprises: at least one processor 1205; and at least one memory 1207 including computer program code 1211, the at least one memory 1207 and the computer program code 1211 configured to, with the at least one processor 1205, cause the apparatus 1201 at least to perform:

obtaining an echo path delay estimate;

obtaining information indicative of a number of future frames used by an acoustic echo cancellation filter wherein the acoustic echo cancellation filter comprises a time-frequency filterbank configured to generate an acoustic echo cancelled signal for a current time frame;

obtaining information indicative of a time shift between consecutive frames processed by the acoustic echo cancellation filter;

determining at least a first delay to be added to a loudspeaker signal; and determining at least a second delay to be added to a microphone signal;

wherein the determination of the first delay and the second delay is based on the echo path delay estimate, the number of future frames and the time shift between consecutive frames processed by the acoustic echo cancellation filter and wherein the first delay and the second delay are determined so that an effective echo path delay is obtained that is dependent upon the time shift.

As illustrated in FIG. 12 the computer program 1209 can arrive at the controller 1203 via any suitable delivery mechanism 1213. The delivery mechanism 1213 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1209. The delivery mechanism can be a signal configured to reliably transfer the computer program 1209. The controller 1203 can propagate or transmit the computer program 1209 as a computer data signal. In some examples the computer program 1209 can be transmitted to the controller 1203 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 1209 comprises computer program instructions for causing an apparatus 1201 to perform at least the following:

obtaining an echo path delay estimate;

obtaining information indicative of a number of future frames used by an acoustic echo cancellation filter wherein the acoustic echo cancellation filter comprises a time-frequency filterbank configured to generate an acoustic echo cancelled signal for a current time frame;

obtaining information indicative of a time shift between consecutive frames processed by the acoustic echo cancellation filter;

determining at least a first delay to be added to a loudspeaker signal; and determining at least a second delay to be added to a microphone signal;

wherein the determination of the first delay and the second delay is based on the echo path delay estimate, the number of future frames and the time shift between consecutive frames processed by the acoustic echo cancellation filter and wherein the first delay and the second delay are determined so that an effective echo path delay is obtained that is dependent upon the time shift.

The computer program instructions can be comprised in a computer program 1209, a non-transitory computer readable medium, a computer program product, a machine readable medium. In some but not necessarily all examples, the computer program instructions can be distributed over more than one computer program 1209.

Although the memory 1207 is illustrated as a single component/circuitry it can be implemented as one or more separate components/circuitry some or all of which can be integrated/removable and/or can provide permanent/semi-permanent/dynamic/cached storage.

Although the processor 1205 is illustrated as a single component/circuitry it can be implemented as one or more separate components/circuitry some or all of which can be integrated/removable. The processor 1205 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software can not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The apparatus 1201 as shown in FIG. 12 can be provided within any suitable device. In some examples the apparatus 1201 can be provided within an electronic device such as a mobile telephone, a teleconferencing device, a camera, a computing device or any other suitable device.

The blocks illustrated in FIG. 3 can represent steps in a method and/or sections of code in the computer program 1209. The illustration of a particular order to the blocks does not necessarily imply that there is a required or preferred order for the blocks and the order and arrangement of the blocks can be varied. Furthermore, it can be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising at least one processor; and at least one memory including computer program code, the at least one memory and the computer program code configured to, with the at least one processor, cause the apparatus at least to:
    obtain an estimate of an echo path delay comprising an estimate of a time delay between a loudspeaker signal and an altered version of the loudspeaker signal comprised in a microphone signal;
    obtain information indicative of a number of future frames used by an acoustic echo cancellation filter wherein the acoustic echo cancellation filter comprises a time-frequency filterbank configured to generate an acoustic echo cancelled signal for a current time frame;
    obtain information indicative of a time shift between consecutive frames processed by the acoustic echo cancellation filter, wherein the time shift between consecutive frames processed by the acoustic echo cancellation filter comprises a hop size;
    determine at least a first delay to be added to a loudspeaker signal for adjusting the echo path delay to reduce an echo in the microphone signal; and
    determine at least a second delay to be added to a microphone signal for adjusting the echo path delay to reduce the echo in the microphone signal,
    wherein the determination of the first delay and the second delay is based on (i) the estimate of the echo path delay, (ii) the number of future frames used by the acoustic echo cancellation filter, and (iii) the time shift between consecutive frames processed by the acoustic echo cancellation filter, and wherein the first delay and the second delay are determined so that an effective echo path delay, resulting from addition of the first delay to the loudspeaker signal and addition of the second delay to the microphone signal, is obtained that is shifted closer to an integer number of hop sizes and further from an odd integer number of half hop sizes.

2. An apparatus as claimed in claim 1, wherein the reducing the echo in the microphone signal comprises-one or more of:

increasing short time objective intelligibility score; and or increasing perceptual evaluation of speech quality score.

3. An apparatus as claimed in claim 1, wherein the first delay and the second delay reduce processing latency of the microphone signal.

4. An apparatus as claimed in claim 3, wherein the reduction in processing latency comprises reducing the processing latency between a microphone and an output of an acoustic echo cancellation processing block.

5. An apparatus as claimed in claim 1, wherein the time-frequency filterbank upon which the acoustic echo cancellation filter is based comprises at least one of:
short term Fourier transform filterbank; and
weighted overlap-add filterbank;
in combination with one or more sub-band adaptive acoustic echo cancellation filters.

6. An apparatus as claimed in claim 1, wherein the effective echo path delay comprises an integer number of hop sizes.

7. An apparatus as claimed in claim 1, wherein the apparatus is caused to enable the first delay to be provided to a first delay unit where the first delay unit is configured to add a delay to at least one loudspeaker signal.

8. An apparatus as claimed in claim 7, wherein the apparatus is caused to enable the first delay to be provided to a plurality of first delay units, where the plurality of first delay units are configured to add a delay to a plurality of loudspeaker signals.

9. An apparatus as claimed in claim 1, wherein the apparatus is caused to enable the second delay to be provided to a second delay unit, where the second delay unit is configured to add a delay to at least one microphone signal.

10. An apparatus as claimed in claim 9, wherein the apparatus is caused to enable the second delay to be provided to a plurality of second delay units, where the plurality of second delay units are configured to add a delay to a plurality of microphone signals.

11. An apparatus as claimed in claim 1, wherein the apparatus is caused to enable a plurality of third delays to be added to a plurality of reduced echo signals to enable encoding for spatial audio.

12. An apparatus as claimed in claim 1, wherein the apparatus is caused to enable the second delay to be provided to a plurality of second delay units, where the plurality of second delay units are configured to add a delay to a plurality of microphone signals.

13. An apparatus as claimed in claim 1, wherein the apparatus is caused to enable the first delay to be added in the time domain and the second delay to be added in the time domain.

14. An apparatus as claimed in claim 1, wherein the apparatus is caused to enable the second delay to be added, at least partially, in the time domain and, at least partially, in the frequency domain.

15. An electronic device comprising an apparatus as claimed in claim 1, wherein the electronic device is at least one of: a telephone, a camera, a computing device, a teleconferencing device.

16. The apparatus as claimed in claim 1, wherein the first delay and the second delay are determined to minimize a difference between the effective echo path delay and a result of multiplying the hop size by the number of future frames used by the acoustic echo cancellation filter.

17. The apparatus as claimed in claim 1, wherein the at least one memory and the computer program code are configured to, with the at least one processor, further cause the apparatus to:

determine whether the estimate of the echo path delay is longer than a result of multiplying the hop size by the number of future frames used by the acoustic echo cancellation filter;

responsive to the estimate of the echo path delay being longer than the result of multiplying the hop size by the number of future frames used by the acoustic echo cancellation filter, determine the second delay is equal to zero; and responsive to the estimate of the echo path delay being shorter than the result of multiplying the hop size by the number of future frames used by the acoustic echo cancellation filter, determine the first delay is equal to zero.

18. A method comprising:

obtaining an estimate of an echo path delay comprising an estimate of a time delay between a loudspeaker signal and an altered version of the loudspeaker signal comprised in a microphone signal;

obtaining information indicative of a number of future frames used by an acoustic echo cancellation filter wherein the acoustic echo cancellation filter comprises a time-frequency filterbank configured to generate an acoustic echo cancelled signal for a current time frame;

obtaining information indicative of a time shift between consecutive frames processed by the acoustic echo cancellation filter, wherein the time shift between consecutive frames processed by the acoustic echo cancellation filter comprises a hop size;

determining at least a first delay to be added to a loudspeaker signal for adjusting the echo path delay to reduce an echo in the microphone signal; and determining at least a second delay to be added to a microphone signal for adjusting the echo path delay to reduce the echo in the microphone signal, wherein the determination of the first delay and the second delay is based on (i) the estimate of the echo path delay, (ii) the number of future frames used by the acoustic echo cancellation filter, and (iii) the time shift between consecutive frames processed by the acoustic echo cancellation filter, and wherein the first delay and the second delay are determined so that an effective echo path delay, resulting from addition of the first delay to the loudspeaker signal and addition of the second delay to the microphone signal, is obtained that is shifted closer to an integer number of hop sizes and further from an odd integer number of half hop sizes.

19. A non-transitory computer-readable storage medium comprising computer program instructions that, when executed by processing circuitry, cause:

obtaining an estimate of an echo path delay comprising an estimate of a time delay between a loudspeaker signal and an altered version of the loudspeaker signal comprised in a microphone signal;

obtaining information indicative of a number of future frames used by an acoustic echo cancellation filter wherein the acoustic echo cancellation filter comprises a time-frequency filterbank configured to generate an acoustic echo cancelled signal for a current time frame;

obtaining information indicative of a time shift between consecutive frames processed by the acoustic echo cancellation filter, wherein the time shift between consecutive frames processed by the acoustic echo cancellation filter comprises a hop size;

determining at least a first delay to be added to a loudspeaker signal for adjusting the echo path delay to reduce an echo in the microphone signal; and determining at least a second delay to be added to a microphone signal for adjusting the echo path delay to reduce the echo in the microphone signal;

wherein the determination of the first delay and the second delay is based on (i) the estimate of the echo path delay, (ii) the number of future frames used by the acoustic echo cancellation filter, and (iii) the time shift between consecutive frames processed by the acoustic echo cancellation filter and wherein the first delay and the second delay are determined so that an effective echo path delay, resulting from addition of the first delay to the loudspeaker signal and addition of the second delay to the microphone signal, is obtained that is shifted closer to an integer number of hop sizes and further from an odd integer number of half hop sizes.

* * * * *